US012726746B2

(12) United States Patent
Lundell et al.

(10) Patent No.: US 12,726,746 B2
(45) Date of Patent: Sep. 1, 2026

(54) PLAYBACK DEVICES HAVING ENHANCED OUTER PORTIONS

(71) Applicant: Sonos, Inc., Santa Barbara, CA (US)

(72) Inventors: Louis Lundell, Santa Barbara, CA (US); Jonathan Oswaks, Thousand Oaks, CA (US); Linduo Liu, Shanghai (CN)

(73) Assignee: Sonos, Inc., Goleta, CA (US)

( * ) Notice: Subject to any disclaimer, the term of this patent is extended or adjusted under 35 U.S.C. 154(b) by 346 days.

(21) Appl. No.: 18/557,402

(22) PCT Filed: Apr. 29, 2021

(86) PCT No.: PCT/CN2021/091015
§ 371 (c)(1),
(2) Date: Oct. 26, 2023

(87) PCT Pub. No.: WO2022/226898
PCT Pub. Date: Nov. 3, 2022

(65) Prior Publication Data
US 2024/0223930 A1 Jul. 4, 2024

(51) Int. Cl.
*H04R 1/02* (2006.01)

(52) U.S. Cl.
CPC ....... *H04R 1/023* (2013.01); *H04R 2201/028* (2013.01)

(58) Field of Classification Search
CPC ................ H04R 1/023; H04R 2499/10; H04R 2430/01; H04R 2201/02; B32B 7/03; B32B 7/12
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |

(Continued)

FOREIGN PATENT DOCUMENTS

| | | | |
|---|---|---|---|
| CN | 106454621 | A | 2/2017 |
| EP | 1389853 | A1 | 2/2004 |

(Continued)

OTHER PUBLICATIONS

AudioTron Quick Start Guide, Version 1.0, Mar. 2001, 24 pages.

(Continued)

*Primary Examiner* — Sunita Joshi
(74) *Attorney, Agent, or Firm* — Fortem IP LLP

(57) ABSTRACT

A playback device including a housing having a first end portion, a second end portion and an intermediate portion therebetween. The playback device can further include an audio transducer at least partially disposed in the intermediate portion and a grille assembly surrounding the intermediate portion between the first and second end portions. The grille assembly can include a substrate and an outer shell surrounding the substrate. The outer shell can include an elastomeric material bonded onto a thermoplastic material, wherein the outer shell includes a perforated portion extending between the first and second end portions of the housing and overlaying the audio transducer, and wherein the perforated face defines a plurality of apertures extending through the elastomeric and thermoplastic materials.

17 Claims, 13 Drawing Sheets

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2014/0270322 | A1 | 9/2014 | Silverstein |
| 2016/0044403 | A1 | 2/2016 | Meehan et al. |
| 2017/0085972 | A1 | 3/2017 | Reichert et al. |
| 2018/0098168 | A1 | 4/2018 | Long et al. |
| 2018/0272644 | A1 * | 9/2018 | Hamada .................... B32B 7/03 |

FOREIGN PATENT DOCUMENTS

| | | |
|---|---|---|
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Searching Authority, International Search Report and Written Opinion mailed on Jan. 27, 2022, issued in connection with International Application No. PCT/CN2021/091015, filed on Apr. 29, 2021, 9 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *DM Holdings* (No. 14-1330-RGA), Di 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

PLAYBACK DEVICES HAVING ENHANCED OUTER PORTIONS

CROSS REFERENCE TO RELATED APPLICATION

This application is a 371 U.S. national phase of International Patent Application No. PCT/CN2021/091015, filed Apr. 29, 2021, which is hereby incorporated by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
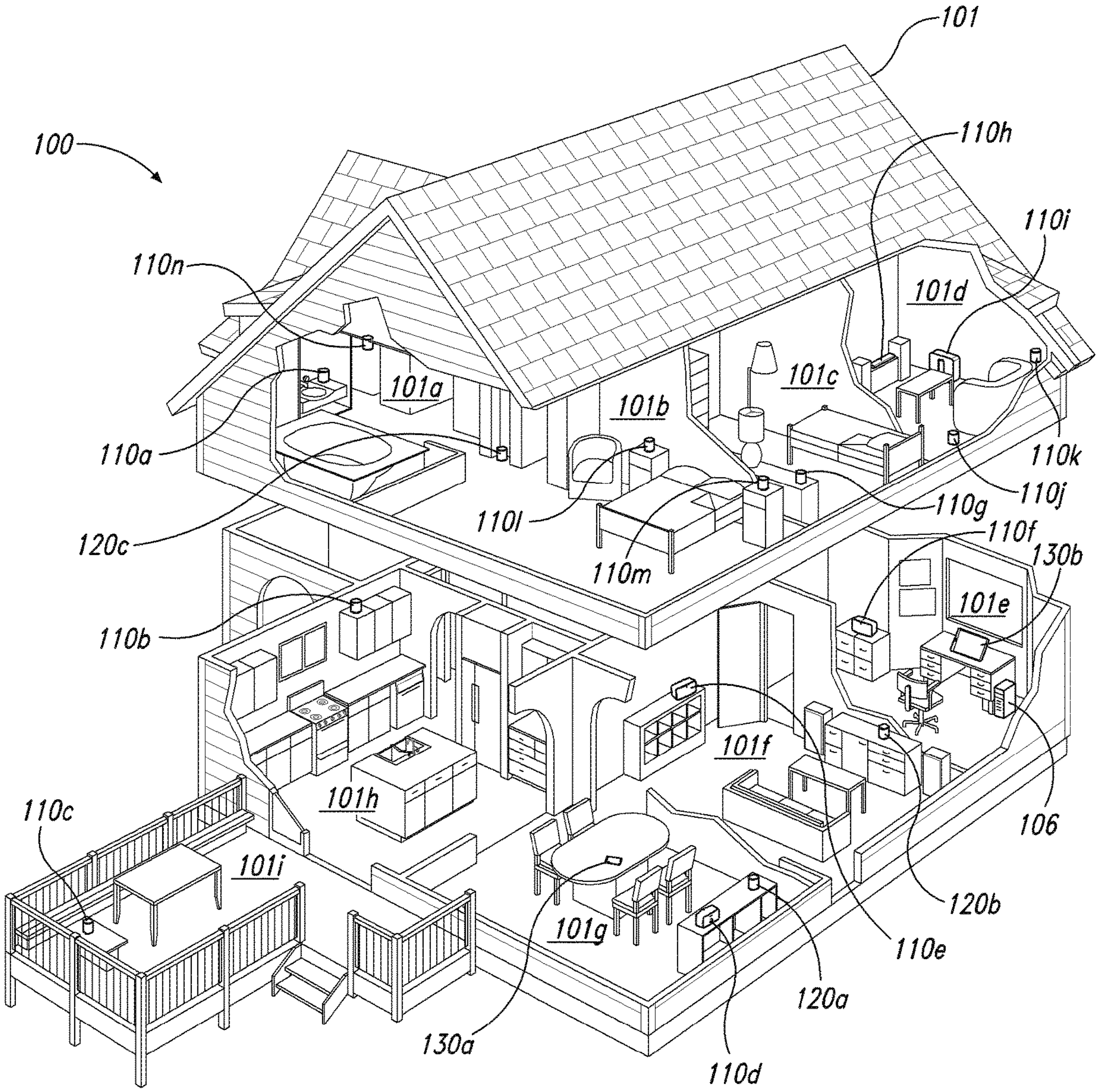
FIG. 1A is a partial cutaway view of an environment having a media playback system configured in accordance with examples of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Audio playback devices often include a grille disposed over the face of a driver to protect the driver and other internal components from damage while still allowing sound to pass through without significant distortion. Soft grilles can take the form of woven cloth or fabric, while hard grilles can take the form or perforated metal or plastic sheets defining a plurality of holes. Conventional approaches for manufacturing such a hard grille for a playback device generally involve a multi-step process. This process starts with procuring a custom extruded sheet of a desired thickness and color. Once procured, each sheet must be inspected, sorted, and prepared for Computer Numerical Control (CNC) drilling. CNC drilling is used to perforate the sheet and typically involves a specialized setup to ensure there are no errors during the process. After drilling, the sheets must be inspected, cleaned, painted, inspected, thermoformed, cooled, inspected, trimmed, and inspected again. Only then is the sheet ready for assembly to a substrate. Assembly to the substrate can involve a gluing process after which there is another inspection before the grille is finally ready for use in a playback device. This grille manufacturing process is typically expensive and time consuming, as the process involves several steps and inspections before the grille is ready for use. Reducing the amount of necessary labor during this process can greatly reduce the attendant cost of manufacturing.

Using a thin sheet or shell to form the grille can reduce the amount of labor needed for manufacturing the grille. By using a thin sheet, the sheet can be punched instead of CNC drilled, which can greatly reduce the amount of cost and labor needed to perforate the sheet. Additionally, using a thin and somewhat flexible sheet reduces the amount of labor needed to assemble the sheet with the substrate. In contrast to use of a more rigid and/or thicker sheet, a thin, somewhat flexible sheet may not require thermoforming, and instead may be bent into proper position over the substrate. As a result of these and other benefits, using a thin sheet can greatly reduce the cost of manufacturing a grille.

To improve the overall look and feel of the grille, the thin sheet can include two or more layers, for example a relatively hard underlying thermoplastic material and a softer overlying elastomeric material. The thermoplastic material, while being more flexible than metal, can be more rigid than the elastomeric material and therefore provide structural solidity to the assembled sheet. Additionally, the thermoplastic material will not degrade Wi-Fi performance unlike other rigid materials, such as metal. While an elastomeric material provides desirable aesthetics as well as touch and feel, punching a thin sheet generally requires a rigid material, otherwise the punching process will tear the sheet rather than properly perforate the sheet with well-defined holes. Accordingly, using a sheet consisting solely of an elastomeric material would not be viable, as the sheet would be damaged during the punching process. However, bonding an elastomeric material to a more rigid underlying material allows for the elastomeric material to be punched, despite having a thin profile. Thus, using a thin sheet with a relatively rigid underlying material (e.g., polycarbonate or other thermoplastic) and an overlying elastomeric material (e.g., silicone) can reduce manufacturing costs and complexity while resulting in a high-quality product.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs 120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of FIG. 1A, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
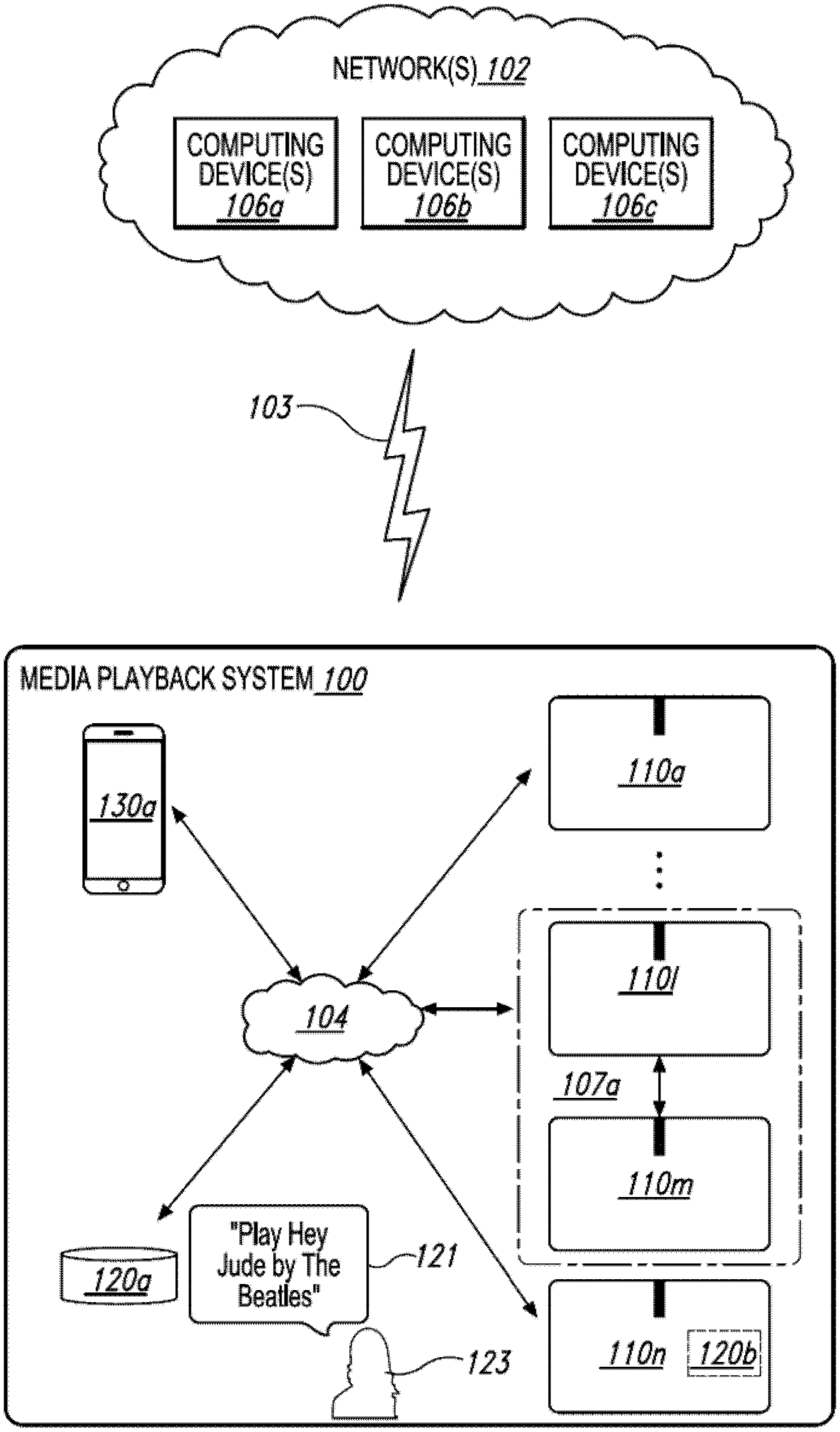
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethemet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHZ, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
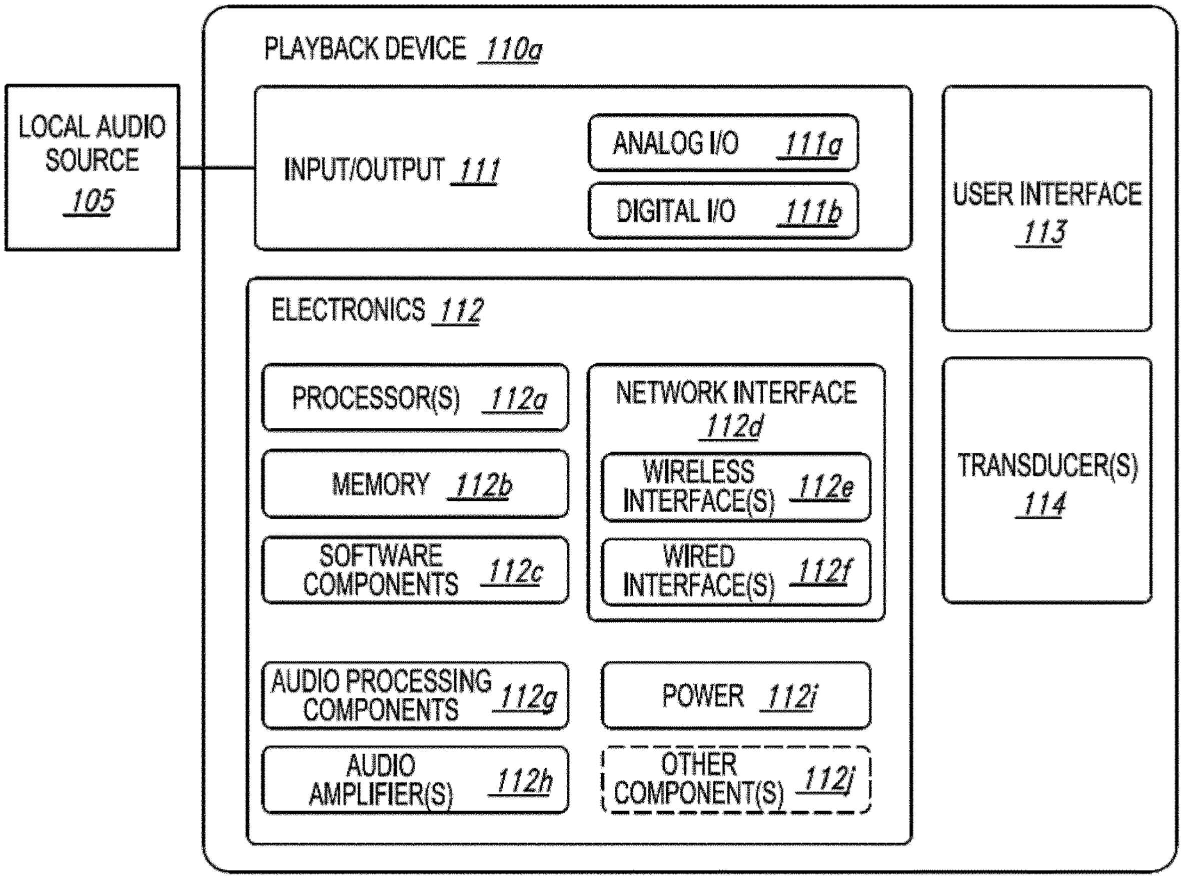
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, for instance, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
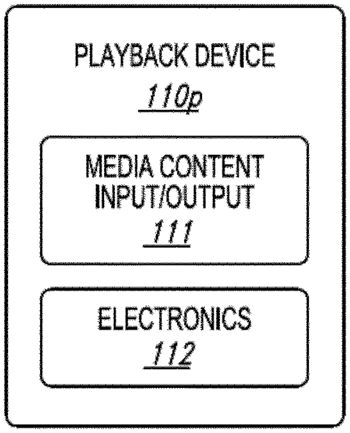
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for example, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
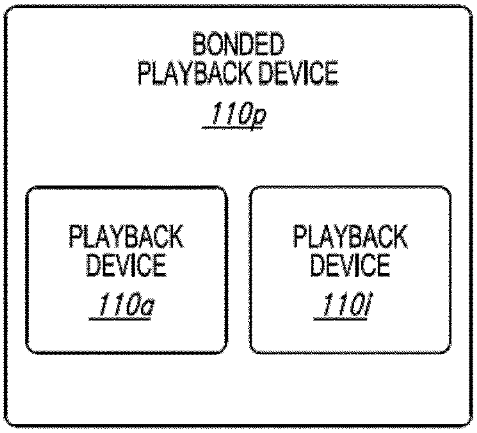
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
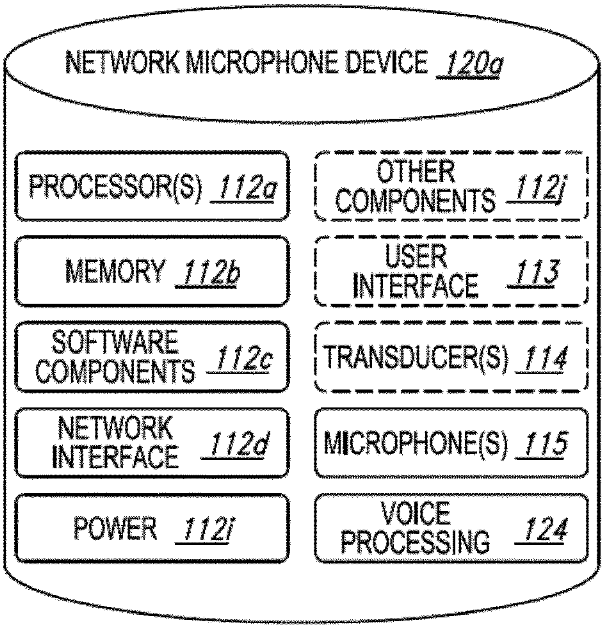
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IOT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
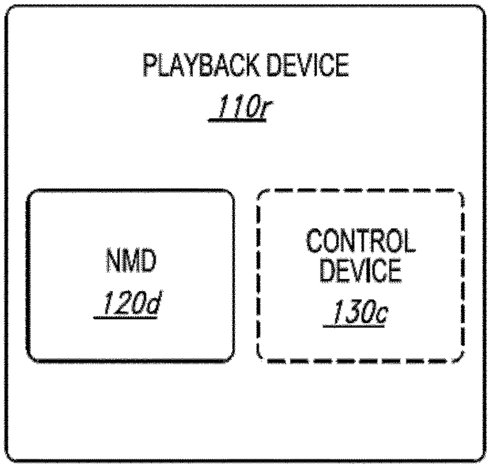
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
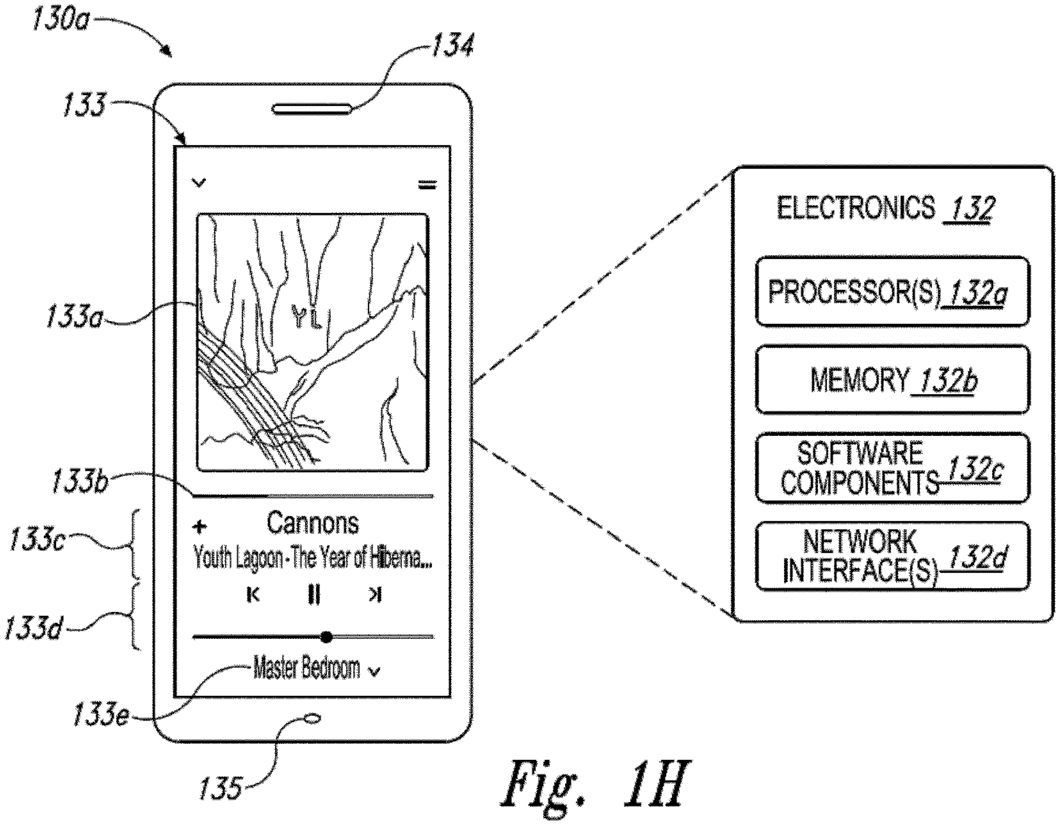
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™ an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, for instance, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices

Figure 2A:
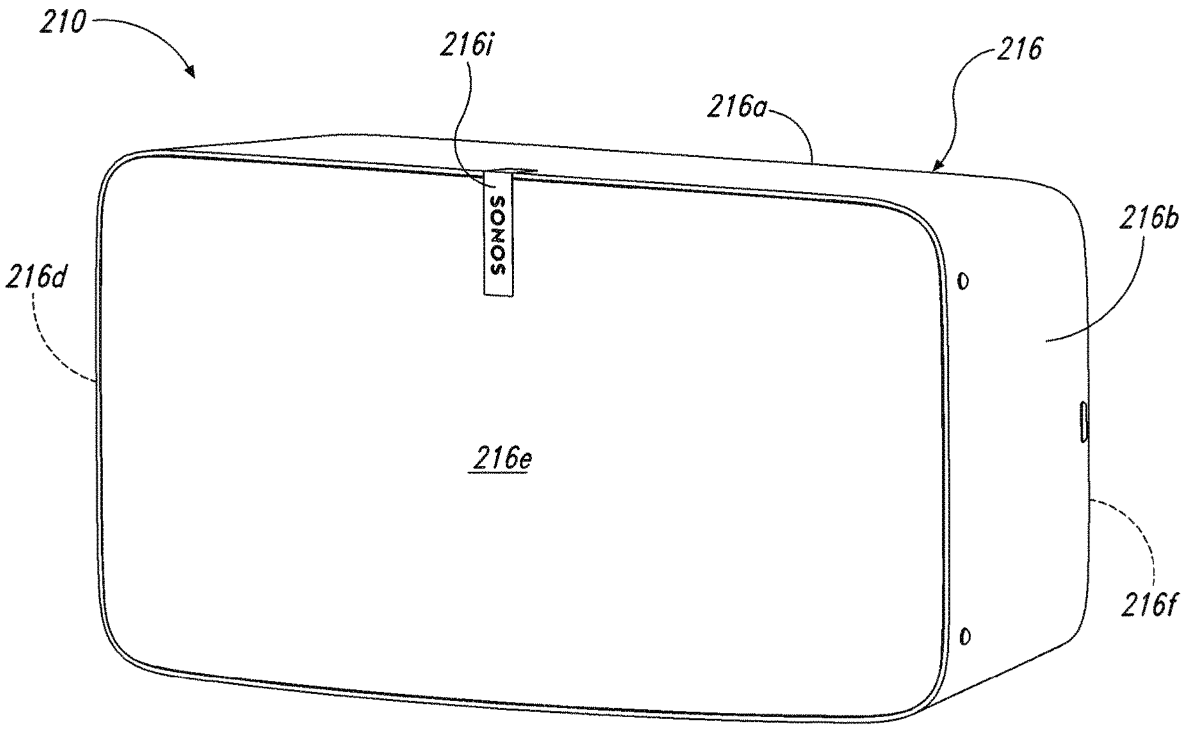
FIG. 2A is a front isometric view of a playback device configured in accordance with examples of the disclosed technology.
Figure 2B:
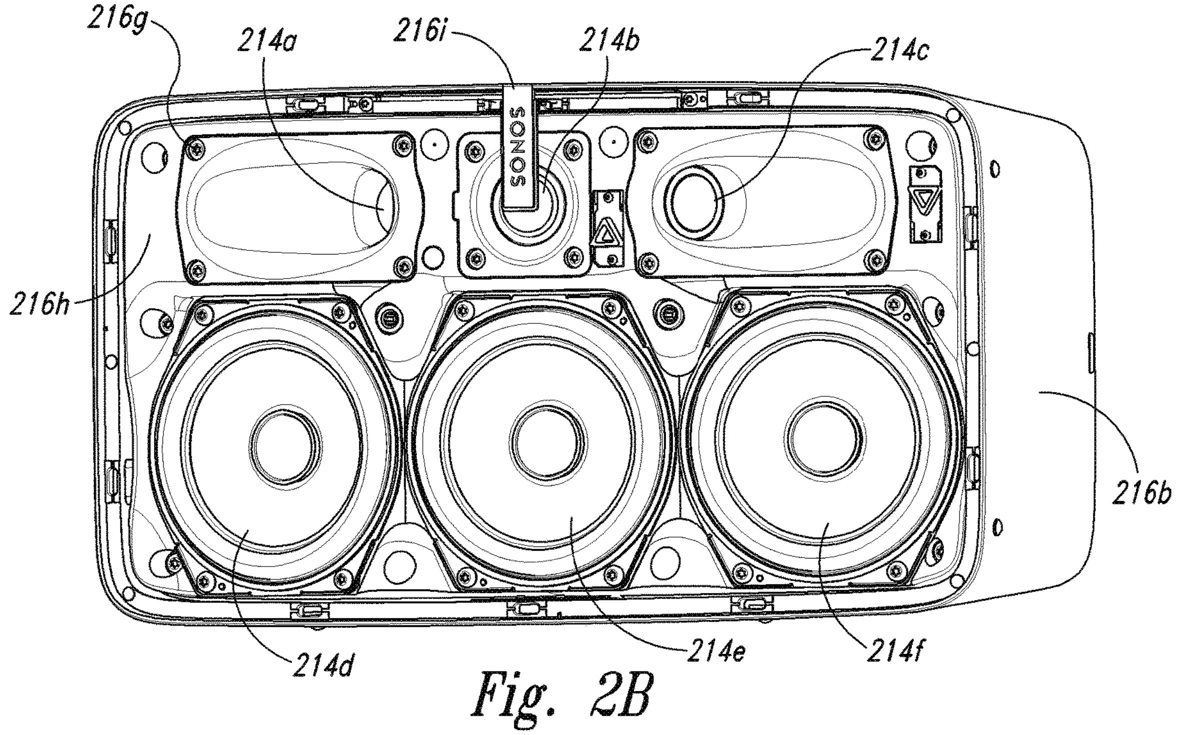
FIG. 2B is a front isometric view of the playback device of FIG. 2A without a grille.
Figure 2C:
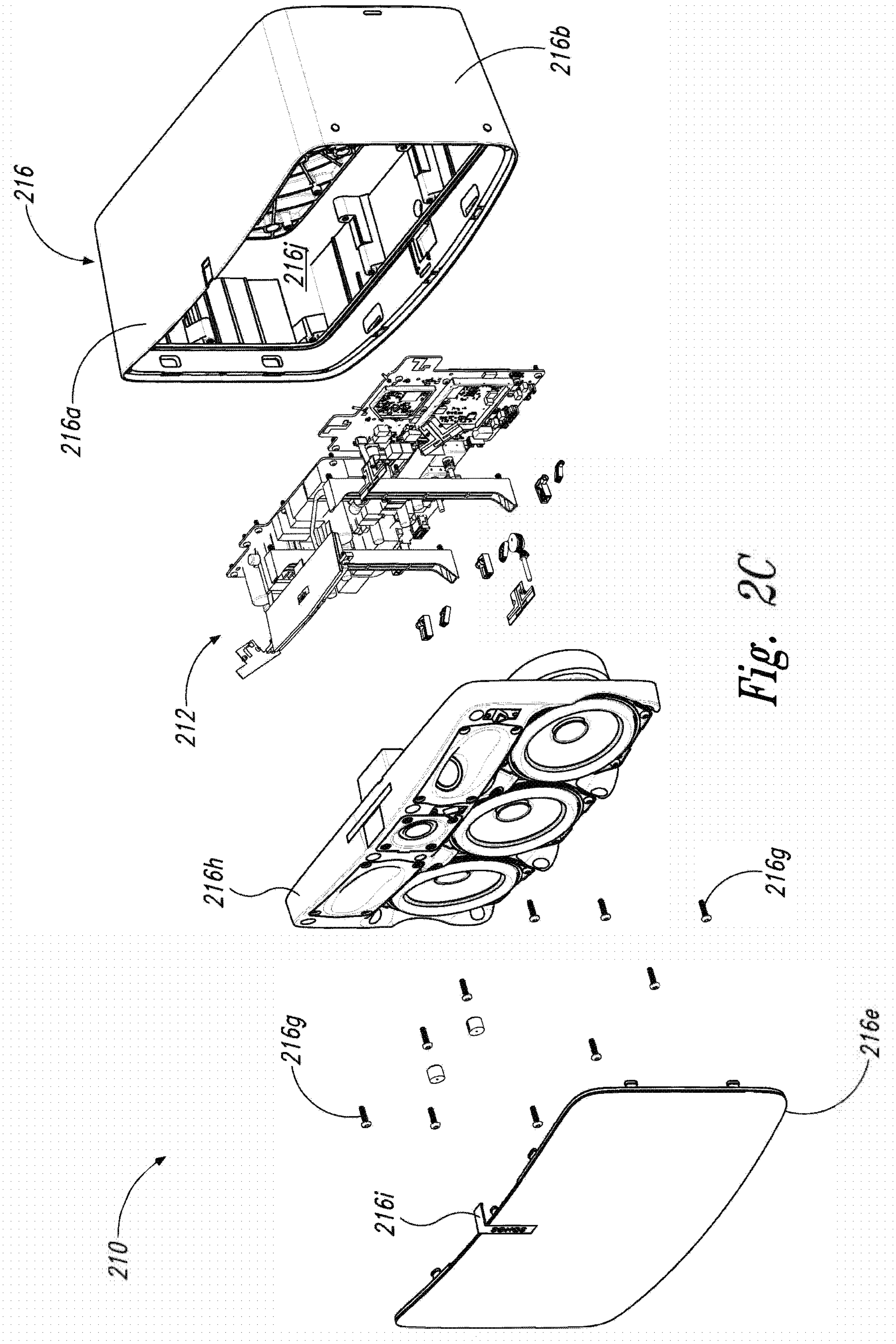
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214.

IV. Example Playback Devices Having Enhanced Outer Portions

As noted elsewhere herein, the outer portion(s) of a playback device can be enhanced by the use of grille assemblies as disclosed herein. For example, instead of forming a grille using a metallic sheet that requires the use of CNC drilling to form hole patterns, examples of the present technology bond an underlying thermoplastic material with an overlying elastomeric material and form holes therethrough using a punching hole perforation process. Various examples of such enhanced outer portions of playback devices are described below with respect to FIGS. 3A-5.

Figure 3A:
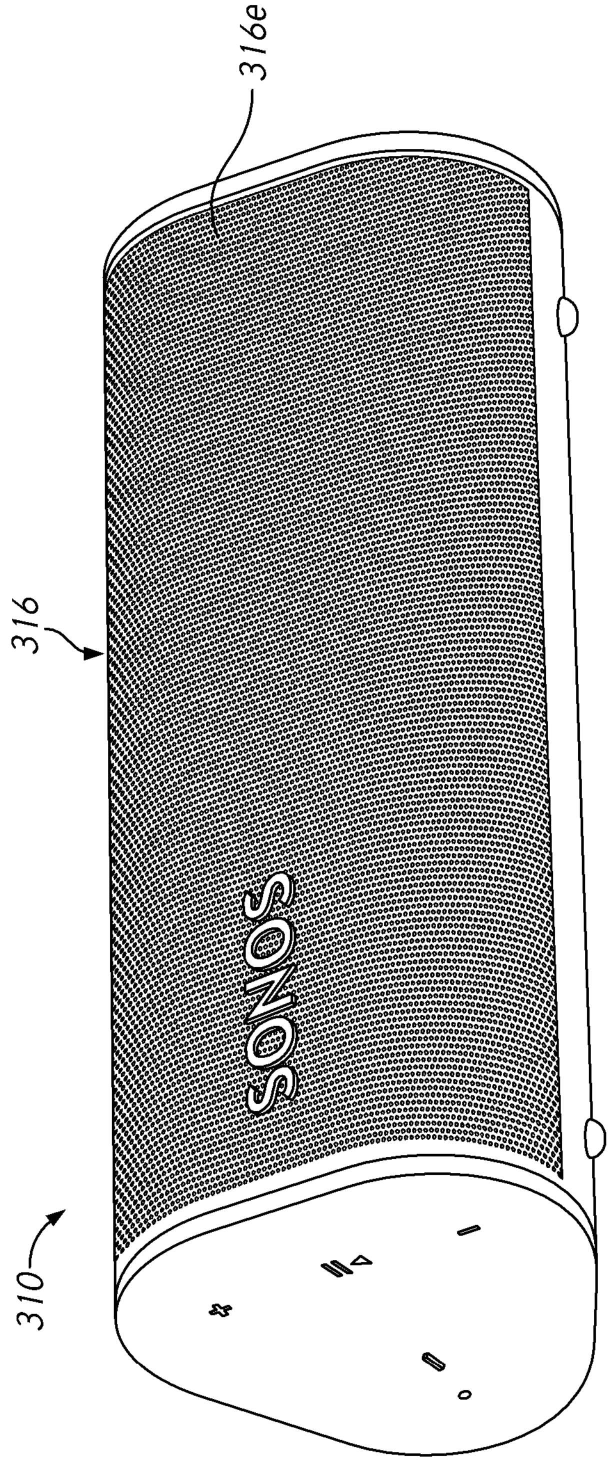
FIG. 3A is a front isometric view of a playback device configured in accordance with examples of the disclosed technology.
Figure 3B:
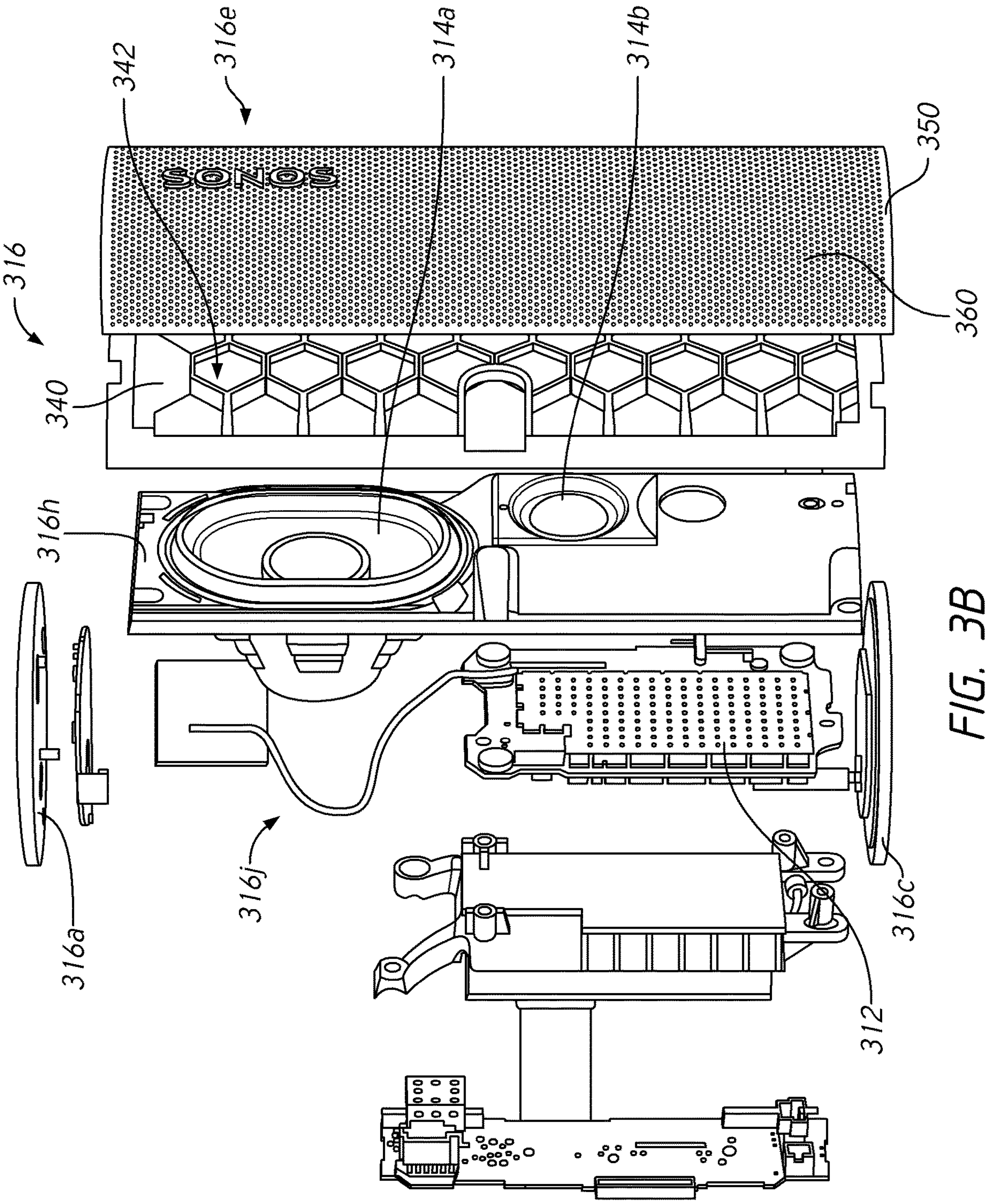
FIG. 3B is an exploded view of the playback device from FIG. 3A with an outer shell partially hidden for clarity.

FIG. 3A is a front isometric view of a playback device 310 configured in accordance with examples of the disclosed technology. FIG. 3B is an exploded view of the playback device 310 from FIG. 3A with the grille 316*e* partially hidden for clarity. Referring to FIGS. 3A and 3B together, the playback device comprises a housing 316 that includes an upper portion 316*a*, a lower portion 316*c*, and the grille 316*e*. In some examples, the housing 316 can take the form of an enclosure. In the illustrated example, the housing 316 forms a generally triangular prism shape having rounded edges. However, the particular shape and dimensions of the housing 316 can vary in different implementations. For example, the housing 316 can be generally cylindrical, spherical or oblate spheroid shape, and can one or more edges that are rounded or sharp.

A cavity 316*j* in the housing 316 is configured to receive a frame 316*h* and electronics 312. The frame 316*h* is configured to carry a plurality of transducers 314 (identified individually in FIG. 3B as transducers 314*a* and 314*b*). The electronics 312 (e.g., the electronics 112 of FIG. 1C) are configured to receive audio content from an audio source and send electrical signals corresponding to the audio content to the transducers 314 for playback.

As illustrated in FIGS. 3A and 3B, the grille 316*e* extends along the housing 316 between the upper portion 316*a* and lower portion 316*c*. The grille 316*e* can take the form of an outer shell 350 that is coupled to an underlying substrate 340. In some examples, the outer shell 350 can take the form of a sheet, which may be formed of one or more layers or materials as described in more detail elsewhere herein. The substrate 340 can be coupled to the housing 316, allowing for the outer shell 350 to surround the housing 316 between the upper portion 316*a* and lower portion 316*c*. The substrate 340 includes several openings 342 formed in the substrate 340 and the outer shell 350 comprises a perforated portion 360 formed in the outer shell 350. As shown, in some examples the openings 342 in the substrate 340 can be much larger than the holes in the perforated portion 360 of the outer shell 350. When the grille 316*e* is coupled to the housing 316, the openings 342 and the perforated portion 360 can overlay the transducers 314.

The grille 316*e* protects the internal components of the playback device 310 (e.g., audio transduces 314*a-b*, electronics 312) from damage while still allowing sound from audio transduces 314*a-b* to pass through the grille 316*e* without significant distortion or attenuation. The outer shell 350 prevents debris from entering the housing 316 and damaging the transducers 314 and electronics 312. The substrate 340 provides additional structural integrity to the outer shell 350, which reduces the amount of physical damage the playback device 310 receives from an accident (such as dropping the playback device 310) or other event. Because the openings 342 of the substrate 340 and the perforated portion 360 of the outer shell 350 overlay the transducers 314 when the grille 316*e* is coupled to the housing 316, sound outputted from the transducers 314 can pass through the grille 316*e* without significant distortion or attenuation.

Figures 3C, 3D, 3E:
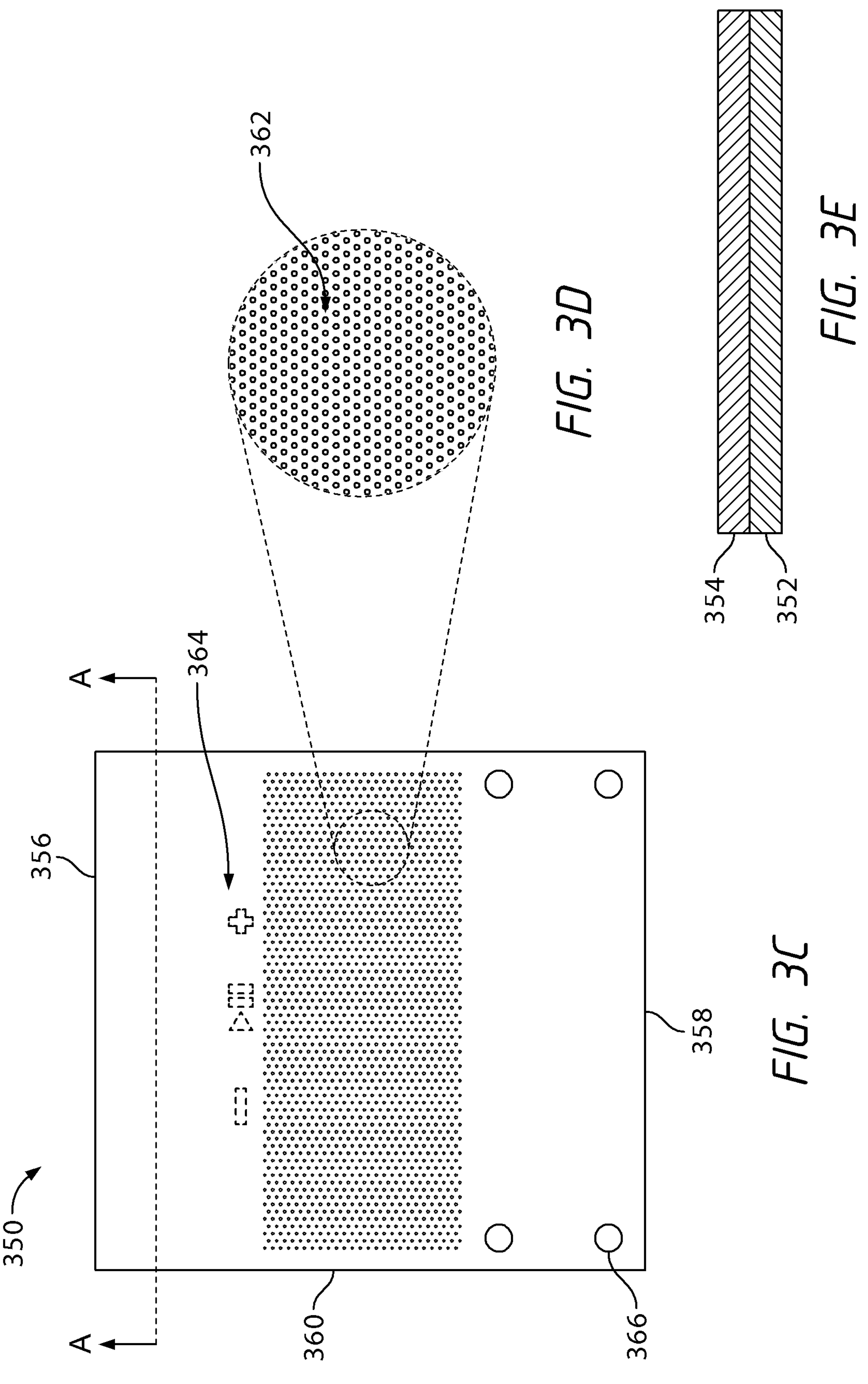
FIG. 3C is a top view of an outer shell in accordance with examples of the disclosed technology.
FIG. 3D is a partial view of a perforated portion of the outer shell from FIG. 3C.
FIG. 3E is a side cross-sectional view of the outer shell from FIG. 3C.

FIG. 3C illustrates a top view of the outer shell 350 and FIG. 3D illustrates a partial view of the perforated portion 360 of the outer shell 350 from FIG. 3C. FIG. 3E illustrates a side cross-sectional view of the outer shell 350 along the sectional cut A-A from FIG. 3C. Referring to FIGS. 3C-3E together, the outer shell 350 comprises a base material 352 with a bonded material 354 disposed over and coupled to the base material 352. The perforated portion 360 of the outer shell 350 is disposed laterally between a first end 356 and a second end 358 of the outer shell 350. The perforated portion 360 can be defined by a plurality of holes 362 that extend through both the base material 352 and bonded material 354. In some examples, the outer shell 350 comprises surface features (e.g., raised portions or recesses). Examples of such surface features include one or more transport controls or buttons 364 and one or more feet 366. The buttons 364 and feet 366 can be formed by the bonded material 354. In some instances (e.g., in the case of buttons 364), the surface features can be positioned to overlie associated electronics, for example allowing the playback device 310 to process user input in the form of pressing one of the buttons 364 formed in or on the outer shell 350. As a result, when a user interacts with the buttons 364 (e.g., presses one or more of the buttons 364), this interaction will result in an instruction being carried out by the electronics 312 or other component of the playback device 310. In various examples, the outer shell 350 does not include any buttons 364 and/or feet 366.

The base material 352 can form the base of the outer shell 350. The base material 352 can have a suitable length and width that allows for the base material 352 to extend between the upper portion 316*a* and lower portion 316*c* of the housing 316, as well as extending circumferentially around the housing 316. In some examples, the base material 352 can have a relatively thin profile (e.g., a thickness of about 1 mm, 0.9 mm, 0.8 mm, 0.7 mm, 0.6 mm, 0.5 mm, 0.4 mm, 0.3 mm, 0.2 mm, 0.1 mm or less). In some instances, the thin profile allows for the base material to be foldable and/or bendable so that the base material 352 can be adjusted during assembly by hand and without the need for external tools (e.g., a thermoformer, press, etc.). In some examples, the base material 352 can have a thicker profile (e.g., a thickness greater than 1 mm). In such cases, the increased thickness can increase the rigidity of the base material 352.

In operation, the base material 352 can provide some degree of rigidity to the outer shell 350. As will be described in further detail below, the relative rigidity of the base material 352 allows for the outer shell 350 to be punched without tearing the outer shell 350. This rigidity can be a result of the material used to form the base material 352 as well as the selected thickness. For example, the base material 352 can be formed from a relatively rigid material, such as a thermoplastic polymer. In some examples, the base material 352 can be formed from an extruded sheet of polycarbonate. In various examples, the base material 352 can be formed from polypropylene, high-density polyethylene, and/or other plastic materials.

The bonded material 354 overlies and is coupled to the base material 352 to form the outer layer of the outer shell 350. The bonded material 354 can be coupled to the base material 352 by placing the bonded material 354 over the base material 352 and performing a bonding process (e.g., applying a bonding adhesive/agent to the materials, pressing the materials together, rolling the materials together, etc.). In some examples, the bonded material 354 is coupled to the base material 352 in a different manner. For instance, the bonded material 354 can be glued, fastened, overmolded, sprayed, deposited, or 3D printed onto the base material 352. The bonded material 352 can have a suitable length and width that allows for the bonded material 354 to extend along the entire length and width of the base material 352. Accordingly, the bonded material 354 can extend between the upper portion 316*a* and lower portion 316*c* of the housing 316, as well as all around the housing 316. In some examples, the bonded material 354 completely covers an outer surface of the underlying base material 352. In various examples, the bonded material 354 can have a relatively thin profile (e.g., a thickness of about 1 mm, 0.9 mm, 0.8 mm, 0.7 mm, 0.6 mm, 0.5 mm, 0.4 mm, 0.3 mm, 0.2 mm, 0.1 mm or less). The thin profile allows for the bonded material 354 to be foldable and/or bendable so that the bonded material 354 and the outer shell 350 can be adjusted during assembly by hand and without the need for external tools (e.g., a thermoformer, press, etc.). In some examples, the bonded material 354 can have a thicker profile (e.g., a thickness greater than 1 mm). In various examples, additional layers of the bonded material 354 can be bonded onto the base material 352 to define one or more surface features, such as the buttons 364 and the feet 366. Additionally or alternatively, one or more intervening materials can be disposed between the base material 352 and the bonded material 354. For example, an adhesive can be disposed between the base material 352 and the bonded material 354.

The bonded material 354 can provide desirable aesthetics as well as touch and feel to the outer shell 350. For example, the bonded material 354 can comprise an elastomeric material, such as silicone or rubber, which provides a desirable look to the outer shell 350 as well as a soft touch and feel. Additionally, some elastomeric materials such as silicone can be formed in a variety of colors through the use of dyes or other additives, allowing for a relatively inexpensive and simple approach to producing a wide variety of color options for the playback device 310.

In some examples, the bonded material 354 has less rigidity and/or stiffness than the base material 352. For example, the bonded material 354 has a first Shore hardness less than a second Shore hardness of the base material 352. Notwithstanding its relative softness and flexibility, the bonded material 354 can provide stability to the housing 316 and/or playback device 310. For example, the feet 366 formed by the bonded material 354 can hold the housing 316 and/or playback device 310 in position and prevent the housing 316 and/or playback device 310 from rolling, sliding, or moving unexpectedly.

As previously described, the outer shell 350 can include a perforated portion 360 defined by a plurality of apertures, openings, voids or holes 362 extending through both the base material 352 and bonded material 354 of the outer shell 350. In various examples, the perforated portion 362 is spaced apart from the edges of the outer shell 350 (e.g., a non-perforated region or border is disposed between the perforated portion 362 and the edges of the shell 350). In some examples, the holes 362 can be formed in the outer shell 350 with a particular pattern and pitch. For instance, in various examples, the holes 362 can have a pitch (i.e., the lateral center-to-center spacing between adjacent holes arranged in a row) of about 2 mm (e.g., 2.15 mm, 2.1 mm, 2.05 mm, 1.95 mm, 1.9 mm, 1.85 mm 1.80 mm, 1.75 mm, etc.) and be arranged in a half-pitch staggered pattern (i.e., the pattern of holes in each horizontal row is offset from that of immediately adjacent vertical rows by a distance equal to one-half of the pitch). In some examples, the holes 362 can have a pitch of about 1 mm (e.g., 1.15 mm, 1.1 mm, 1.05 mm, 0.95 mm, 0.9 mm, 0.85 mm 0.80 mm, 0.75 mm, etc.) and be arranged in a staggered pattern. In some examples, the holes are staggered at about 30 degrees, 45 degrees, or 60 degrees. Additionally or alternatively, the holes 362 may not be staggered. In some examples, the holes are arranged in a linear pattern. In various examples, the holes 362 are arranged in a non-linear pattern, such as a circular pattern. The holes 362 can be formed in a variety of shapes and sizes. For example, the holes 362 can be round with a diameter of about 0.4 mm, 0.6 mm, 0.8 mm, 1.0 mm, 1.2 mm, or other suitable diameter. In various examples, the holes 362 can be square, rectangular, hexagonal, and/or slot-shaped. Together, the holes 362 can define an open area of the perforated portion 360. By controlling the size, pitch, and arrangement of the holes 362, the open area of the perforated portion 360 can be controlled to reach desirable levels (e.g., allow for sound to pass through the open area without being distorted and/or attenuated). In various examples, the open area of the perforated portion can be between at least about 10% and about 90% of the surface area of the perforated portion. In some examples, the open area of the perforated portion can be between about 40% and about 80% of the surface area of the perforated portion.

The perforated portion 360 can extend across at least a portion of the outer shell 350. For example, the perforated portion can extend across about 5% to 95% of the outer shell 350. The holes 362 can be formed by punching the outer shell 350 (e.g., using one or more punches to mechanically remove material from the outer shell 350 to define the holes 362). In some examples, the holes 362 are formed in a different manner. For example, the holes 362 can be drilled, laser cut, etched, or formed from a mold. In some examples, the outer shell 350 comprises a blank portion in addition to the perforated portion 360. The blank portion can be defined as the portion of the outer shell 350 that does not contain the perforated portion 360. In some instances, the blank portion comprises more than 50% of the surface area of the outer shell while the perforated portion 360 comprises less than 50% of the outer shell.

In some examples, the outer shell 350 can have a relatively thin profile. For instance, the outer shell 350 can have a thickness of about 1 mm or less (e.g., 0.9 mm, 0.8 mm, 0.7 mm, 0.6 mm, 0.5 mm, 0.4 mm, etc.). The thin profile of the outer shell 350 allows for the outer shell 350 to have some flexibility, which can beneficially allow for the outer shell 350 to be bent into position by hand when coupling the outer shell 350 to the substrate 340 without damaging the outer shell 350 and without needing to thermoform the outer shell 350. Despite having a thin profile, the outer shell 350 can still be punched without damaging the base material 352 or the bonded material 354. In some situations, punching a thin layer of a material can damage and/or tear the material, particularly if the material is relatively flexible and/or soft. For instance, punching a 0.5 mm layer of silicone can tear the material, especially when attempting to obtain a close-knit hole pitch and pattern (such as the hole pitch and pattern described herein), holes of a small size (e.g., holes less than 1 mm in diameter), and/or a perforated portion 360 with a particular open area (such as the open area described herein). This tearing can result in undesirable properties, such as jagged appearance and/or irregular hole formations. By coupling the overlying bonded material 354 with a more rigid underlying base material 352, this tearing affect can be avoided, as the rigidity of the base material 352 allows for both the bonded material 354 and the base material 352 to be punched without tearing.

Figure 3F:
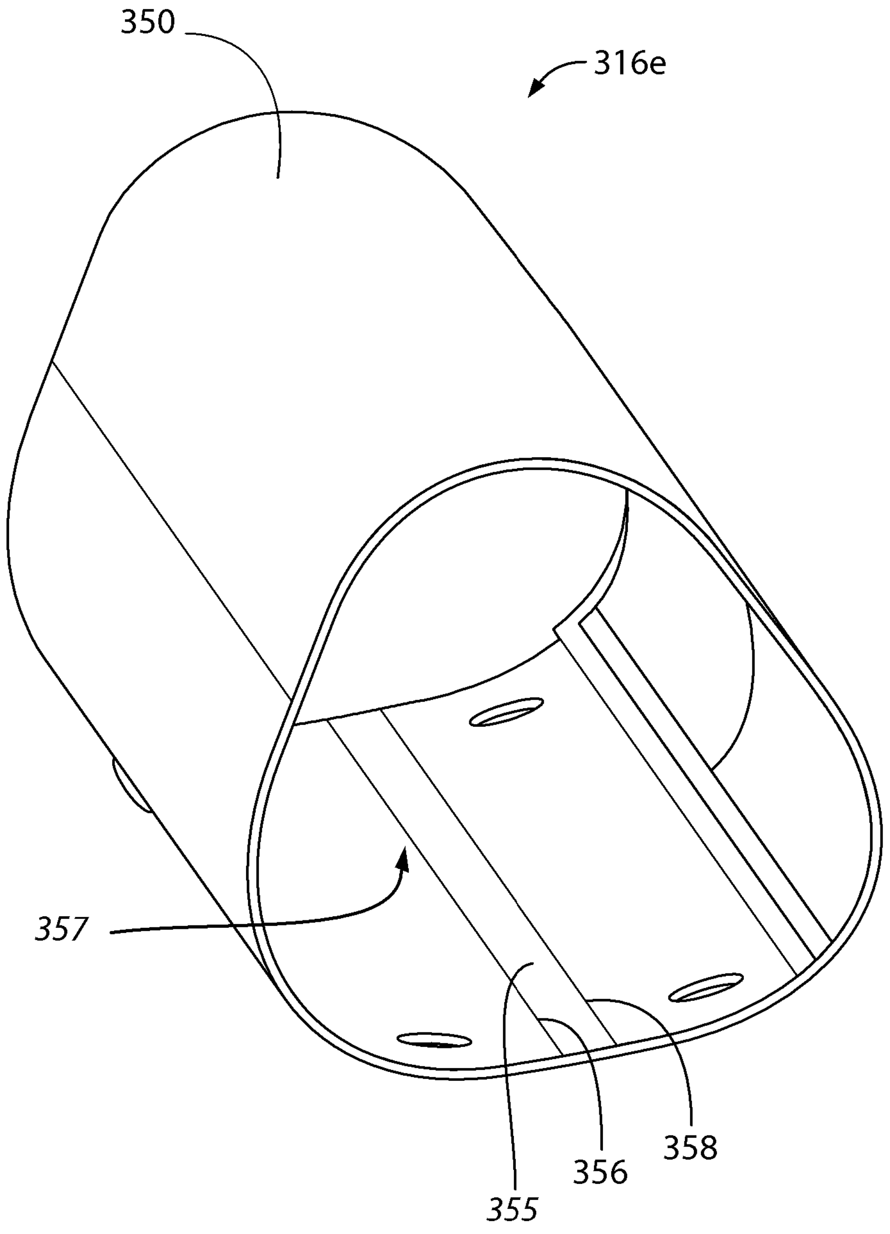
FIG. 3F is an isometric view of an outer shell coupled together with a seam in accordance with examples of the disclosed technology.
Figure 3G:
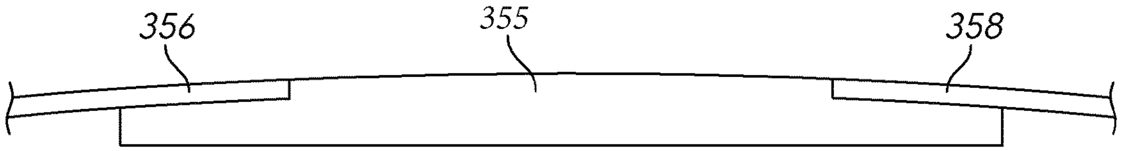
FIG. 3G is a side view of a seam in accordance with examples of the disclosed technology.
Figure 3H:
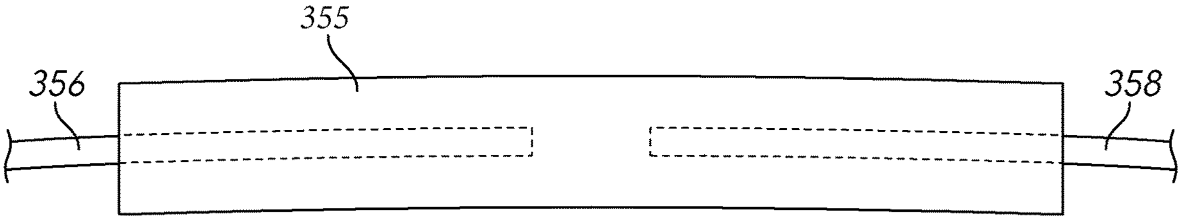
FIG. 3H is a side view of a seam in accordance with examples of the disclosed technology.
Figure 3I:
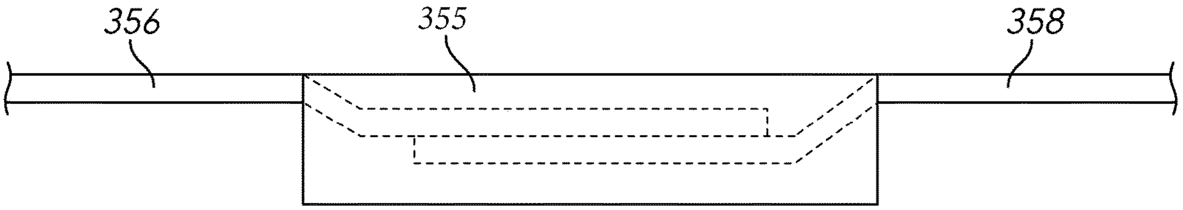
FIG. 3I is a side view of a seam in accordance with examples of the disclosed technology.

FIG. 3F illustrates an isometric view of the grille 316 with the first end 356 and second end 358 coupled together. FIGS. 3G-3I illustrate several example side views of a seam 355 that couples the first end 356 and second end 358 together. Referring to FIGS. 3F-3I together, the outer shell 350 is curled around to form a tubular shape and the first end 356 and second end 358 of the outer shell 350 are coupled together by a seam 355. When the first end 356 and second end 358 are coupled together, the grille **316*e* and/or outer shell 350 form an opening 357 at the center of the grille 316*e*. The opening 357 can be defined by the space between the walls of the outer shell 350. The opening 357 is sized so that the housing 316 can be received within the opening 357 when the housing 316 is coupled to the grille 316*e*. Accordingly, the opening 357, the outer shell 350, and/or the grille 316*e* can have a profile and/or shape that corresponds to the profile of the housing 316 so that the grille 316*e* forms a proper fit with the housing 316 when the grille 316*e* is coupled to the housing 316. In some examples, the opening 357, outer shell 350, and/or grille 316*e* form rounded triangular prism shape. In various examples, the opening 357, outer shell 350, and/or grille 316*e* form a cylindrical profile. In some examples, the substrate 340 is positioned at least partially within the opening 357 when the substrate 340 is coupled to the outer shell 350**.

As illustrated in FIGS. 3F-3I, the seam 355 can couple the first end 356 to the second end 358. The seam 355 can be a layer of the bonded material 354 that is overmolded onto the first end 356 and second end 358. The seam 355 can be overmolded onto the first end 356 and second end 358 in multiple ways. For example, as shown in FIG. 3G, the first end 356 and second end 358 can be spaced apart from one another while the seam 355 fills the gap between the first end 356 and second end 358. As shown in FIG. 3H, in some examples, the seam 355 can encapsulate at least a part of the first end 356 and second end 358. As shown in FIG. 3I, in some examples, the first end 356 and the second end 358 can overlap one another, with the seam 355 surrounding the overlapped portion of the first end 356 and second end 358. In some examples, the first end 356 and second end 358 are coupled together without overmolding the seam 355 onto the first end 356 and second end 358. For example, the first end 356 and second end 358 can be coupled together by one or more fasteners or through an adhesive. Additionally or alternatively, the first end 356 and second end 358 can be coupled together through thermopressing.

Figure 4:
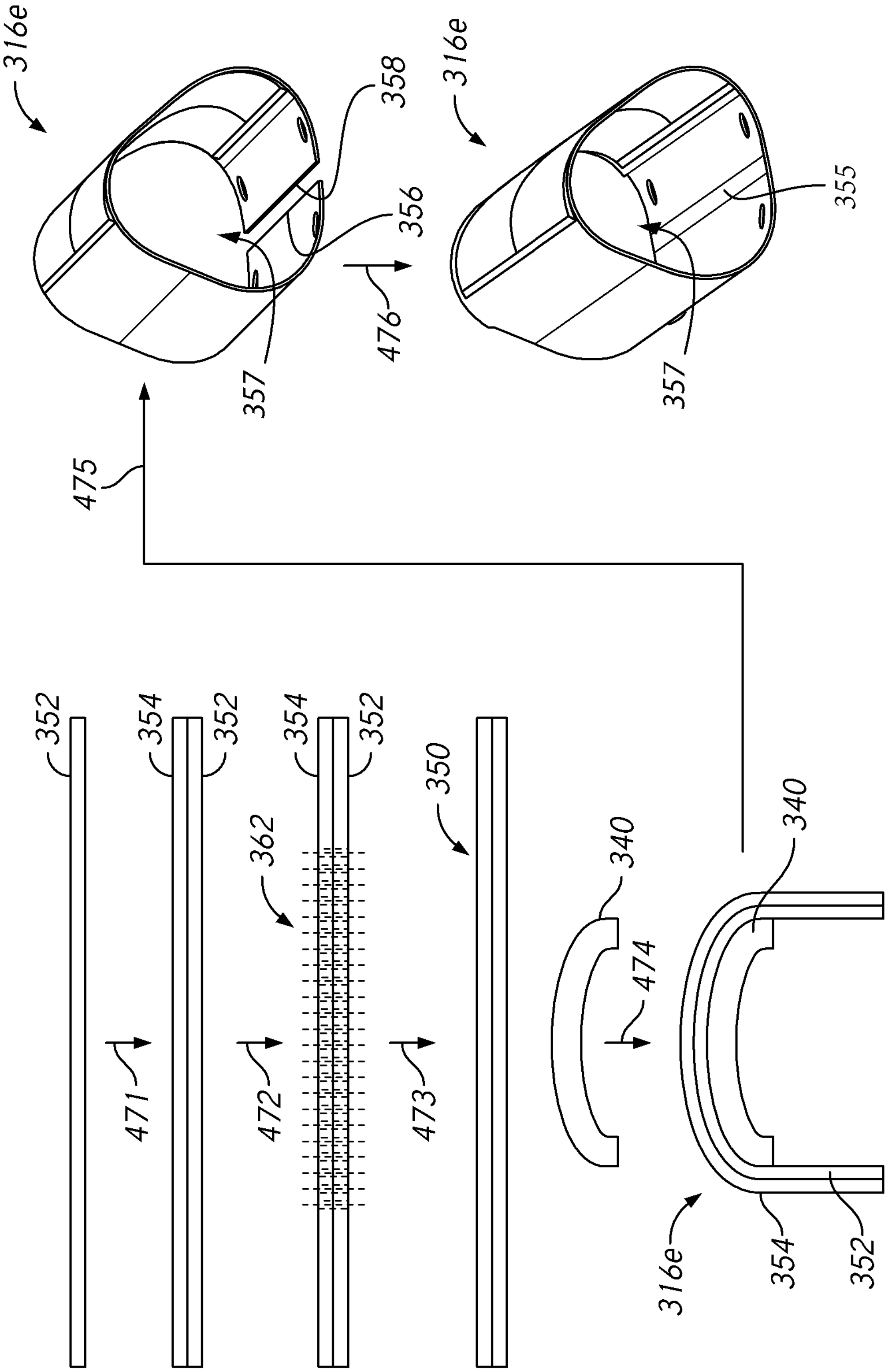
FIG. 4 is an example flow diagram that illustrates preparing a grille.

FIG. 4 illustrates an example flow diagram of preparing a grille **316*e*. The process can start with a prepared sheet of the base material 352. Step 471 illustrates coupling the base material 352 with the bonded material 354 to form the outer shell 350. The bonded material 354 can be coupled to the sheet of the base material 352 by bonding the bonded material 354 onto the base material 352. In some examples, when bonding the bonded material 354 onto the base material 352, surface features, such as buttons 364 and feet 366 can be formed with the bonded material 354. In various examples, the bonded material 354 is coupled to the base material 352 by overmolding the bonded material 354 onto the base material 352. Step 472 illustrates forming the perforated portion 360 in the outer shell 350. The perforated portion 360 is formed in the outer shell 350 by forming a plurality of holes 362 in the outer shell 350. As illustrated in FIG. 4, the plurality of holes 362 extend through the base material 352 and the bonded material 354. The plurality of holes 362 are formed by punching the outer shell 350 to a desired hole pitch and pattern. In some examples, the plurality of holes 362 are formed by drilling the outer shell 350. Step 473 illustrates preparing the outer shell 350 for coupling to the substrate 340. The outer shell 350 can be prepared for coupling to the substrate 340 by properly aligning the outer shell 350 with the substrate 340 (e.g., arranging the outer shell 350 and the substrate 340 so that the perforated portion 360 aligns with the openings 342 in the substrate 340). In some examples, an adhesive can be applied to the outer shell 350 and/or substrate 340. In various examples, the outer shell 350 is thermoformed so that the outer shell 350 is malleable and can be properly aligned with the substrate 340. Step 474 illustrates coupling the outer shell 350 to the substrate 340 to form the grille 316***e*. The outer shell 350 is coupled to the substrate 340 through an adhesive. In some examples, the outer shell 350 is coupled to the substrate 340 by thermopressing the outer shell 350 onto the substrate 340. In various examples, the outer shell 350 is coupled to the substrate 340 by fastening the outer shell 350 and substrate 340 together. As illustrated in FIG. 4, when the outer shell 350 is coupled to the substrate 340, the first end 356 and second end 358 of the outer shell 350 can extend away and/or overhang from the ends of the substrate 340.

Step 475 illustrates preparing the first end 356 and second end 358 of the outer shell 350 for coupling together. The first end 356 and the second end 358 of the outer shell 350 can be arranged adjacent to one another so that the grille 316*e* defines the opening 357. The opening 357 (and the outer shell 350) are arranged in a profile and/or shape that matches the profile of the housing 316 so that the grille 316*e* can form a proper fit with the housing 316 when the grille 316*e* is coupled to the housing 316. Step 476 illustrates coupling the first end 356 and second end 358 of the outer shell 350 together. The first end 356 and second end 358 can be coupled together by overmolding the bonded material 354 onto the first end 356 and second end 358 so that the bonded material 354 forms a seam along the first end 356 and second end 358. In some examples, the first end 356 and second end 358 are coupled together by bonding the bonded material 354 onto the first end 356 and second end 358. In various examples, the bonded material 354 seals the first end 356 and second end 358 together. In some examples, an adhesive is used to couple the first end 356 and second end 358.

Figure 5:
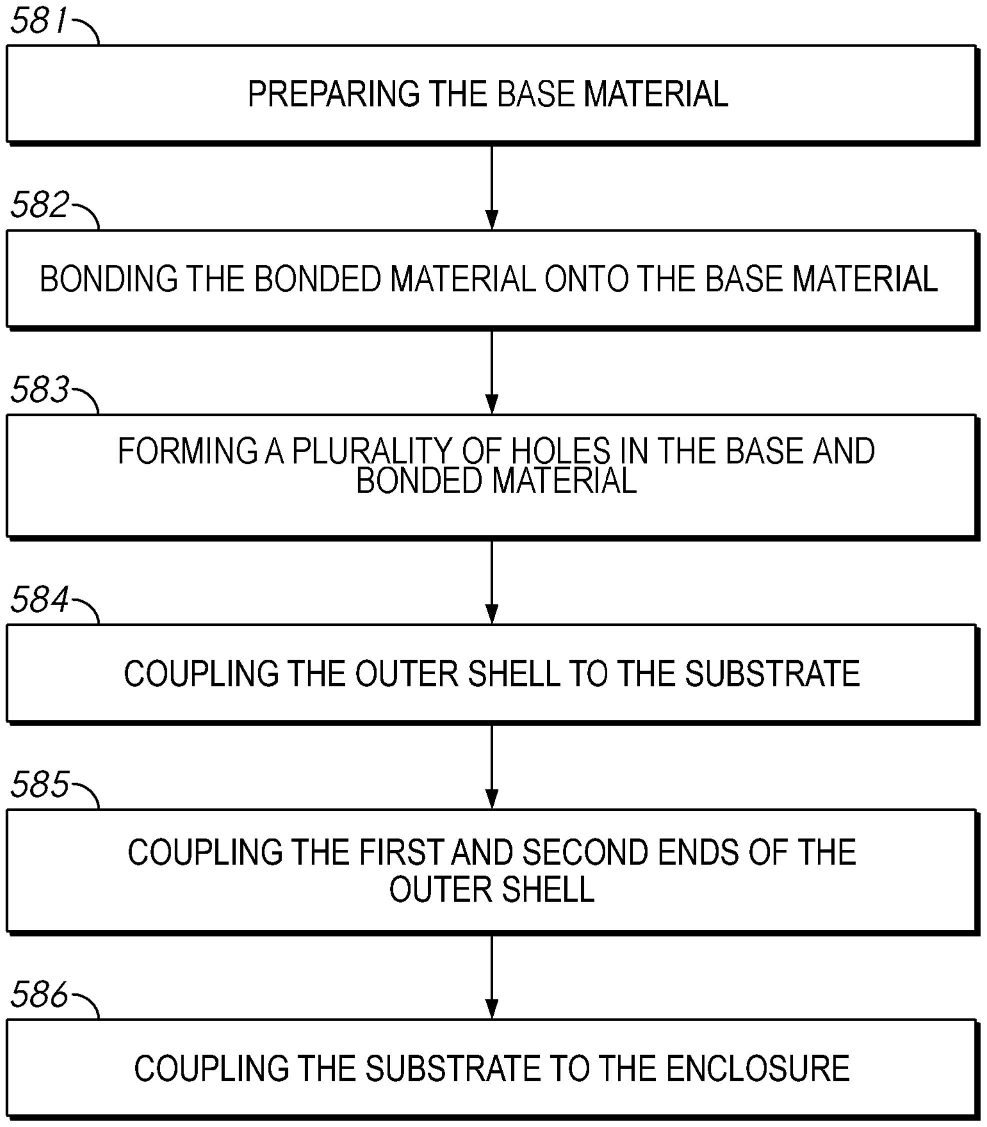
FIG. 5 illustrates an example method of preparing a grille.

FIG. 5 illustrates an example method of preparing a grille 316*e*. At step 581, the method starts with preparing the base material 352. The base material 352 is prepared by forming (or selecting) a sheet of base material 352 to a desired thickness, length, and width. In some examples, preparing the base material 352 further comprises painting the base material 352 or selecting a desired color for the base material 352. In various examples, the bonded material 354 can be prepared to have the desired color, such as by the use of dyes or other additives. Next, at step 582, the bonded material 354 is coupled to the base material 352 to form the outer shell 350.

The bonded material 354 can be coupled to the base material 352 by bonding the bonded material 354 onto the base material. In various examples, the bonded material 354 is coupled to the base material 352 by overmolding the bonded material 354 onto the base material 352. In some examples, step 582 further includes forming feet and buttons on the base material 352 with the bonded material 354. In some cases, longer sheets of the base material 352 and the bonded material 354 can be arranged and bonded together before being divided into sheets that are each sized for a single playback device 310. This approach can facilitate mass production of a dual-layer outer shell 350 as described herein.

At step 583, the perforated portion 360 is formed in the outer shell 350 by forming a plurality of holes in the outer shell 350. The plurality of holes 362 are formed by punching the outer shell 350 to the desired hole pitch and pattern. As one example, a series of sequential punches can be used to mechanically form the holes 362. Additionally or alternatively, the plurality of holes 362 can be formed by use of a drill, laser, etching, or other suitable approach. Next, at step 584, the outer shell 350 is coupled to the substrate 340. Coupling the outer shell 350 to the substrate can include aligning the substrate 340 with the outer shell 350 so that the desired portion of the outer shell 350 overlaps the substrate 340. For example the outer shell 350 and the substrate 340 can be aligned so that at least a portion of the perforated portion 360 aligns with the openings 342 in the substrate 340. To couple the outer shell 350 with the substrate 340, an adhesive can be applied to the outer shell 350 and/or substrate 340 and then the outer shell 350 and the substrate 340 can be pressed together so that the adhesive holds the outer shell 350 and the substate 340 in place. In some examples, the outer shell 350 is coupled to the substrate 340 by thermoforming the substrate 340 and outer shell 350 together. Additionally or alternatively, the outer shell 350 can be coupled to the substrate 340 by fastening the outer shell 350 and substrate 340 together.

At step 585, the first end 356 and second end 358 of the outer shell 350 are coupled together. Coupling the first end 356 and the second end 358 of the outer shell 350 can include first curling the outer shell 350 around into a generally tubular shape and arranging the first end 356 and second end 358 adjacent to one another so that the grille 316*e* defines an opening 357. The opening 357 can have a profile that corresponds to the profile of the housing 316 so that the grille 316*e* can form a proper fit with the housing 316 when the grille 316*e* is coupled to the housing 316. The first end 356 and second end 358 may then be coupled together by overmolding the bonded material 354 onto the first end 356 and second end 358 so that the bonded material 354 forms a seam along the first end 356 and second end 358. In some examples, the first end 356 and second end 358 are coupled together by bonding the bonded material 354 onto the first end 356 and second end 358. Additionally or alternatively, the first end 356 and second end 358 can be fastened together. At step 586, grille 316*e* is coupled to the housing 316. The grille 316*e* can be coupled to the housing 316 by fastening the substrate 340 to the housing 340. As one example, the substrate 340 is themopressed onto the enclosure. In some instances, the grille 316*e* can be coupled to housing 316 before the first end 356 and second end 358 are coupled together.

V. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A playback device, comprising: a housing comprising a first end portion, a second end portion and an intermediate portion therebetween; an audio transducer at least partially disposed in the intermediate portion; and a grille assembly surrounding the intermediate portion between the first and second end portions, the grille assembly comprising: a substrate; and an outer shell surrounding the substrate, the outer shell comprising an elastomeric material bonded onto a thermoplastic material, wherein the outer shell includes a perforated portion extending between the first and second end portions of the housing and overlaying the audio transducer, and wherein the perforated portion defines a plurality of apertures extending through the elastomeric and thermoplastic materials.

Example 2. The playback device of Example 1, wherein the outer shell has a rounded triangular prism shape.

Example 3. The playback device of any one of the proceeding Examples, wherein the outer shell has a cylindrical shape.

Example 4. The playback device of any one of the proceeding Examples, wherein the outer shell comprises a blank portion.

Example 5. The playback device of Example 4, wherein more than 50% of the surface area of the outer shell, and wherein the perforated portion comprises less than 50% of the outer shell.

Example 6. The playback device of any one of the proceeding Examples, wherein the outer shell comprises a first end coupled to a second end, the first end and second end being coupled together by the elastomeric material.

Example 7. The playback device of any one of the proceeding Examples, wherein the elastomeric material defines a plurality of feet on the outer shell, the plurality of feet being configured to stabilize the housing.

Example 8. A grille assembly for a playback device, the grille assembly comprising: a substrate; and an outer shell coupled to the substrate, the outer shell having a thermoplastic material and an elastomeric material bonded onto an outer surface of the thermoplastic material, the thermoplastic material having a greater stiffness than the elastomeric material, the outer shell defining a perforated face, the perforated face having a plurality of holes extending through the thermoplastic material and elastomeric material, the outer shell further comprising a first end and a second end, the first end and second end being coupled together.

Example 9. The grille assembly of Example 8, wherein the holes have a size between 0.5 mm and 1 mm.

Example 10. The grille assembly of Examples 8 or 9, wherein the holes have a pitch between 0.5 mm and 2 mm.

Example 11. The grille assembly of any of Examples 8-10, wherein, within the perforated face, an open area defined by the holes is at least 40%.

Example 12. The grille assembly of any of Examples 8-11, wherein the outer shell has a thickness of less than 0.5 mm.

Example 13. The grille assembly of any of Examples 8-12, wherein the thermoplastic material has a higher Shore hardness than the elastomeric material.

Example 14. The grille assembly of any of Examples 8-13, wherein the thermoplastic material comprises polycarbonate and the elastomeric material comprises silicone.

Example 15. The grille assembly of any of Examples 8-14, wherein the elastomeric material defines a plurality of feet configured to stabilize the grille.

Example 16. The grille assembly of any of Examples 8-15, wherein the first end and the second end are coupled together by the elastomeric material.

Example 17. The grille assembly of Example 16, wherein the elastomeric material seals the first end and second end together.

Example 18. The grille assembly of any of Examples 8-17, wherein the outer shell defines an opening, the substrate being positioned at least partially within the opening.

Example 19. The grille assembly of any of Examples 8-18, wherein the plurality of holes are punched through the thermoplastic material and elastomeric material.

Example 20. A playback device, comprising: an enclosure; an audio transducer at least partially surrounded by the enclosure; and a grille assembly coupled to and extending around the enclosure, the grille assembly comprising: a substrate; and an outer shell coupled to the substrate, the outer shell having a first material and a second material bonded onto the first material, the outer shell defining a perforated face, the perforated face having a plurality of holes extending through the first material and second material; wherein at least a portion of the perforated face is disposed over the audio transducer.

Example 21. The playback device of Example 20, wherein the outer shell further comprises a first end and a second end, the first end and second end being coupled together.

Example 22. The playback device of Example 21, wherein the second material seals the first end and second end together.

Example 23. The playback device of any of the Examples 20-22, wherein the holes have a size between 0.5 mm and 1 mm.

Example 24. The playback device of any of the Examples 20-23, wherein the holes have a pitch between 0.5 mm and 2 mm.

Example 25. The playback device of any of the Examples 20-24, wherein, within the perforated face, an open area defined by the holes is at least 40%.

Example 26. The playback device of any of the Examples 20-25, wherein the outer shell has a thickness of less than 0.5 mm.

Example 27. The playback device of any of the Examples 20-26, wherein the first material has a higher Shore hardness than the second material.

Example 28. The playback device of any of the Examples 20-27, wherein the first material comprises a thermoplastic and the second materials comprises an elastomeric material.

Example 29. The playback device of Example 28, wherein the first material comprises polycarbonate and the second material comprises silicone.

Example 30. The playback device of any of the Examples 20-29, wherein the second material defines a plurality of feet configured to stabilize the enclosure.

Example 31. The playback device of any of the Examples 20-30, wherein the grille assembly defines an opening, the enclosure being positioned at least partially within the opening.

Example 32. The playback device of any of the Examples 20-31, wherein the second material defines a button configured to interact with the enclosure.

Example 33. A method of forming a grille for a playback device, comprising: bonding a first material onto an outer shell comprising a second material, the outer shell having a first end and a second end; after bonding the first material onto the outer shell, forming a plurality of holes extending through the first and second materials; coupling the outer shell to a substrate; and coupling the first end of the outer shell to the second end of the outer shell.

Example 34. The method of Example 33, wherein forming the plurality of holes comprises punching the plurality of holes through the first and second materials.

Example 35. The method of Example 33 or 34, wherein coupling the first end of the outer shell to the second end of the outer shell comprises sealing the first end to the second end with the first material.

Example 36. The method of any of the Examples 33-35, wherein coupling the first end of the outer shell to the second end of the outer shell comprises overmolding the first material onto the first end and second end.

Example 37. The method of any of the Examples 33-36, wherein the second material has a higher Shore hardness than the first material.

Example 38. The method of any of the Examples 33-37, wherein the first material comprises an elastomeric material and the second material comprises a thermoplastic material.

Example 39. The method of Example 38, where the first material comprises silicone and the second material comprises polycarbonate.

Example 40. The method of any of the Examples 33-39, further comprising forming feet on the outer shell with the first material, the feet being configured to stabilize a playback device.

Example 41. The method of any of the Examples 33-40, further comprising forming a button on the outer shell with the first material, the button being configured to interact with an enclosure.

Example 42. The method of any of the Examples 33-41, wherein coupling the outer shell to the substrate comprises thermopressing the outer shell onto the substrate.

Example 43. The method of any of the Examples 33-42, further comprising coupling the substrate to an enclosure.

Example 44. The method of Example 43, wherein coupling the substrate to the enclosure comprises thermopressing the substrate onto the enclosure.

The invention claimed is:

1. A playback device, comprising:

a housing comprising a first end portion, a second end portion and an intermediate portion therebetween;

an audio transducer at least partially disposed in the intermediate portion; and a grille assembly surrounding the intermediate portion between the first and second end portions, the grille assembly comprising:

a substrate; and an outer shell surrounding the substrate, the outer shell comprising an elastomeric material bonded onto a thermoplastic material, wherein the outer shell includes a perforated portion extending between the first and second end portions of the housing and overlaying the audio transducer, and wherein the perforated portion defines a plurality of apertures extending through the elastomeric and thermoplastic materials, wherein the elastomeric material defines a plurality of feet on the outer shell, the plurality of feet being configured to stabilize the housing.

2. The playback device of claim 1, wherein the outer shell has a rounded triangular prism shape.

3. The playback device of claim 1, wherein the outer shell has a cylindrical shape.

4. The playback device of claim 1, wherein the outer shell comprises a blank portion.

5. The playback device of claim 4, wherein more than 50% of the surface area of the outer shell, and wherein the perforated portion comprises less than 50% of the outer shell.

6. The playback device of claim 1, wherein the outer shell comprises a first end coupled to a second end, the first end and second end being coupled together by the elastomeric material.

7. A grille assembly for a playback device, the grille assembly comprising:

a substrate; and an outer shell coupled to the substrate, the outer shell having a thermoplastic material and an elastomeric material bonded onto an outer surface of the thermoplastic material, the thermoplastic material having a greater stiffness than the elastomeric material, the outer shell defining a perforated face, the perforated face having a plurality of holes extending through the thermoplastic material and elastomeric material, the outer shell further comprising a first end and a second end, the first end and second end being coupled together, wherein the elastomeric material defines a plurality of feet configured to stabilize the grille.

8. The grille assembly of claim 7, wherein, within the perforated face, an open area defined by the holes is at least 40%.

9. The grille assembly of claim 7, wherein the outer shell defines an opening, the substrate being positioned at least partially within the opening.

10. The grille assembly of claim 7, wherein the plurality of holes are punched through the thermoplastic material and elastomeric material.

11. A playback device, comprising:

an enclosure;

an audio transducer at least partially surrounded by the enclosure; and a grille assembly coupled to and extending around the enclosure, the grille assembly comprising:

a substrate; and an outer shell coupled to the substrate, the outer shell having a first material and a second material bonded onto the first material, the outer shell defining a perforated face, the perforated face having a plurality of holes extending through the first material and second material, wherein the second material defines a plurality of feet configured to stabilize the enclosure, wherein at least a portion of the perforated face is disposed over the audio transducer.

12. The playback device of claim 11, wherein the outer shell further comprises a first end and a second end, the first end and second end being coupled together.

13. The playback device of claim 12, wherein the second material seals the first end and second end together.

14. The playback device of claim 11, wherein, within the perforated face, an open area defined by the holes is at least 40%.

15. The playback device of claim 11, wherein the first material comprises a thermoplastic and the second materials comprises an elastomeric material.

16. The playback device of claim 11, wherein the grille assembly defines an opening, the enclosure being positioned at least partially within the opening.

17. The playback device of claim 11, wherein the second material defines a button configured to interact with the enclosure.

* * * * *